PATTON & MIDDLETON.
Corn Sheller.
No. 99,106.                              Patented Jan. 25, 1870.
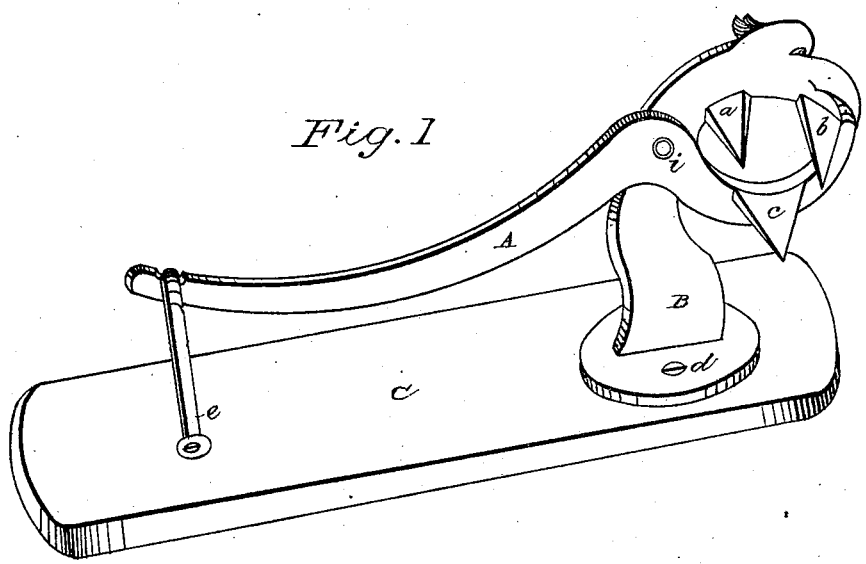
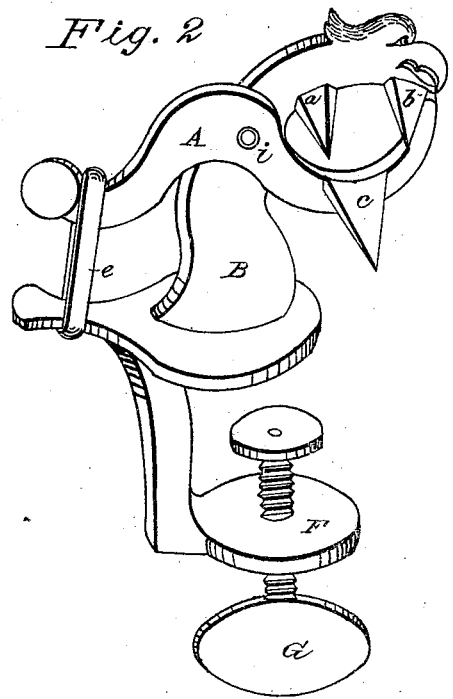

United States Patent Office.

WILLIAM P. PATTON AND WILLIAM A. MIDDLETON, OF HARRISBURG, PENNSYLVANIA; SAID PATTON ASSIGNS HIS RIGHT TO SAID MIDDLETON.

Letters Patent No. 99,106, dated January 25, 1870.

---

IMPROVEMENT IN CORN-SHELLERS.

---

The Schedule referred to in these Letters Patent and making part of the same

---

*To all whom it may concern:*

Be it known that we, WILLIAM P. PATTON and WILLIAM A. MIDDLETON, of the city of Harrisburg, county of Dauphin, and State of Pennsylvania, have invented a new and useful Improvement in "Corn-Shellers;" and we do hereby declare that the following is a full, clear, and exact description of the same, reference being made to the accompanying drawings, making a part of this specification.

In the drawings—

Figure 1 is a perspective view of the corn-sheller, when attached to a base-board.

Figure 2 is also a perspective view of the device, constructed with a screw-clamp or holder, whereby it may be adjusted in position upon a table or other suitable object, when in use.

The essential features of novelty in this invention consist in pivoting a loose jaw upon a stationary one, said jaws being provided with angular or saw-tooth-shaped projections, that are intended to unseat the corn from the cob, substantially as hereinafter set forth.

The construction of the device is as follows:

Upon a base-board, C, fig. 1, the stationary jaw, B, is fastened by screws, or other proper method. This jaw is shaped substantially as is shown, curving forward, so that its under side, that is formed of the pivot $i$, will be sufficiently arched to conform to the surface of ordinary-sized ears of corn.

Upon the side of this jaw B, two angular teeth or projections, $a\ b$, are formed, of a proper length and thickness. These teeth are placed a proper distance apart, upon the side of the arched part of B, as seen in fig. 1.

The jaw A, fig. 1, is shaped substantially as shown. Its forward end is curved in a similar manner to jaw B, and has a single angular tooth or projection, $c$, formed upon it, upon the same side as those upon B are placed.

The lower jaw A is pivoted upon the stationary jaw B, by a rivet, $i$, fig. 1, so as to allow it to vibrate or play easily upon the same.

Said jaw A has a limb or continuation in the rear of rivet $i$, that serves as a lever to control the action of the forward part of the jaw. A notch is formed upon its extreme end, for the reception of a gum band, $e$, that is rigidly secured to the base-board C, and thus acts as a spring to regulate the action of the forward part of the jaw. As the extreme front end of jaw A is constructed to impinge upon the like portion of jaw B, the spring $e$ has a tendency to hold said portions together. This leaves an opening between the curved portions of the jaws A and B, sufficiently large to permit the insertion of the small end of the cob of an ear of corn of moderate size.

The jaws of the device shown in fig. 2, are constructed upon their forward ends, the same as in fig. 1. The only material difference in the construction of fig. 2 from fig. 1 consists in adapting its form to provide a screw-clamp attachment or holder, so that the implement may be securely fastened in proper position, upon any suitable object or article, when in use.

The limb upon jaw A is made shorter than that on A, fig. 1, and is formed as shown in fig. 2. The base part $d$ has a continuation formed upon its rear, for the reception and retaining of the gum band-spring $e$, that is stretched over it, and the end of the limb on jaw A, as seen in the figure.

The screw-holder is constructed in the ordinary manner, of sufficient size to securely hold the implement.

The teeth or angular projections $a\ b\ c$, upon the jaws A B, have their edges bevelled so as to form a sharp point upon them, and moderately sharp edges upon the sides that bear against the cob.

The base-board C should be made long enough to permit the person using the sheller to sit upon it, by placing it under him when seated, upon a chair or bench.

The manner of operating the implement is as follows:

An ear of corn is grasped by its but end in the right hand, and the small end presented to the teeth upon the jaws A B, the ear is forced forward with proper pressure, and at the same time rotated by the hand. The teeth penetrate between the rows of corn close to the cob, and dislodge or shell it therefrom rapidly. After a portion of the ear has been shelled, both hands can be used.

The peculiar form of the shelling-teeth enables the operator to shell or remove green corn from the ear as well as dried corn, the teeth bearing against the cob with a sufficient degree of force to extract all the substance of the grain therefrom in a perfectly satisfactory manner.

We do not desire to limit ourselves to the use of gum in the construction of the spring, as other material and forms of springs it is evident can be adapted and used to advantage.

Having given a full, clear, and exact description of our invention, and its manner of operation, and set forth its advantages,

What we claim as new, of our invention, and desire to secure by Letters Patent of the United States, is—

The fixed jaw B, pivoted jaw A, with teeth $a\ b\ c$, and spring $e$, when constructed and arranged as herein shown and described, for the purpose set forth.

WM. P. PATTON. [L. S.]
WILLIAM A. MIDDLETON. [L. S.]

Witnesses:
JOHN C. MOYER,
J. M. CRISWELL.